United States Patent
Yoo et al.

(10) Patent No.: US 9,197,264 B1
(45) Date of Patent: Nov. 24, 2015

(54) REDUCING INTERFERENCE FOR MULTIPLE RECEIVE ANTENNAS

(71) Applicant: QUALCOMM Incorporated, San Diego, CA (US)

(72) Inventors: Taesang Yoo, San Diego, CA (US); Wooseok Nam, San Diego, CA (US); Roberto Rimini, San Diego, CA (US); Jibing Wang, San Diego, CA (US); Yongbin Wei, San Diego, CA (US); Muhammad Sayed Khairy Abdelghaffar, Irvine, CA (US); Joseph Patrick Burke, Glenview, IL (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/330,558

(22) Filed: Jul. 14, 2014

(51) Int. Cl.
*H04B 1/10* (2006.01)
*H04B 7/04* (2006.01)

(52) U.S. Cl.
CPC ............. *H04B 1/10* (2013.01); *H04B 7/0413* (2013.01)

(58) Field of Classification Search
CPC ...... H04B 1/10; H04B 7/0413; H04B 7/0857; H04B 1/7115; H04B 1/7117; H04B 1/712; H04B 2201/70701; H04B 2201/709727; H04B 7/0848; H04B 7/0851; H04B 7/0871; H04B 7/0897; H04B 1/62; H04B 7/0456
See application file for complete search history.

(56) References Cited

U.S. PATENT DOCUMENTS

| | | | |
|---|---|---|---|
| 8,331,511 B2 | 12/2012 | Beidas et al. | |
| 8,442,443 B2* | 5/2013 | Stirling-Gallacher | H04B 7/0695 455/60 |
| 8,989,762 B1* | 3/2015 | Negus | H04W 24/02 370/341 |
| 9,071,299 B1* | 6/2015 | Schelstraete | H04B 7/0452 |
| 2004/0176909 A1* | 9/2004 | Desjardins | 701/213 |
| 2009/0135972 A1 | 5/2009 | Tanaka et al. | |
| 2010/0330946 A1* | 12/2010 | Akkarakaran et al. | 455/273 |
| 2011/0200089 A1* | 8/2011 | Umeda et al. | 375/232 |
| 2012/0295558 A1 | 11/2012 | Wang et al. | |
| 2013/0077580 A1* | 3/2013 | Kang | H04B 7/061 370/329 |
| 2013/0177116 A1 | 7/2013 | Wyville | |
| 2013/0260806 A1 | 10/2013 | Allpress | |
| 2014/0073257 A1* | 3/2014 | Tujkovic | H04B 1/123 455/63.1 |
| 2014/0362766 A1* | 12/2014 | Strait | H04L 25/03006 370/328 |
| 2015/0029951 A1* | 1/2015 | Sano et al. | 370/329 |
| 2015/0036621 A1* | 2/2015 | Shin | 370/329 |

OTHER PUBLICATIONS

ISA/EPO, International Search Report and Written Opinion of the International Searching Authority, Int'l App. No. PCT/US2015/039320, Sep. 10, 2015, European Patent Office, Rijswijk, NL 11 pgs.

* cited by examiner

*Primary Examiner* — Hirdepal Singh
(74) *Attorney, Agent, or Firm* — Holland & Hart LLP

(57) ABSTRACT

Methods, systems, and devices are described for reducing interference for wireless communication in a wireless device with multiple receive antennas. In aspects for reducing interference, a combined signal may be generated by combining a plurality of received signals from a plurality of respective receive antennas of the wireless device, for example, using one or more different types of combining A common distortion of the plurality of received signals may be estimated based at least in part on the combined signal, and interference reduction may be performed on one or more of the plurality of received signals based at least in part on the estimated common distortion.

32 Claims, 9 Drawing Sheets

REDUCING INTERFERENCE FOR MULTIPLE RECEIVE ANTENNAS

FIELD OF DISCLOSURE

The following relates generally to wireless communication, and more specifically to reducing interference for multiple receive antennas.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some wireless communication systems, multiple radio access technologies (RATs) may be simultaneously used by a single or multiple different devices—for example, a user equipment (UE) may have a wireless local area network (WLAN) connection with a Wi-Fi router and simultaneously have a wireless wide area network (WWAN) connection with an LTE eNodeB. Or, a first UE may have a WLAN connection with a Wi-Fi router while a second, nearby UE has an WWAN connection with an LTE eNodeB. In either scenario, and generally speaking, transmissions on one RAT may interfere with transmissions on another RAT due to, for example, third order harmonics arising from non-linear components in the transmission chain of the "aggressor" signal, adjacent channel interference leakage, intermodulation interference, and so forth. This interference can distort the received signals and lead to degradation in the wireless communication. One method for reducing the distortion is to use a non-linear interference cancelation (NLIC) filter, by which the distortion caused by the aggressor signal is estimated and then removed from the victim received signal.

Many devices today include multiple receive antennas for any given type of RAT, including for use in multiple-input-multiple-output (MIMO) applications. The distortion seen at each of the multiple receive antennas may, however, be different in both phase and magnitude than the distortion seen at the other receive antennas due to the different physical location of each receive antenna, and thus the different propagation paths and times from a common transmitter. Conventionally, a separate NLIC filter is used for each receive antenna in order to separately remove the distortion at each of the receive antennas.

SUMMARY

The described features generally relate to one or more improved systems, methods and/or apparatuses for reducing interference in systems with multiple receive antennas. The received signals from the multiple receive antennas may be combined into a combined signal, with combining weights given to the multiple received signals based on how much distortion and/or noise is present in each of the multiple received signals. The combined signal may be provided to a non-linear interference cancellation (NLIC) or other adaptive filter in order to extract a distortion component that is common to the multiple received signals. That common distortion may then be made specific to each of the received signals by multiplying the common distortion by a vector representing the magnitude and phase of the common distortion in each specific received signal. The antenna-specific distortion can then be subtracted from the received signal corresponding to that antenna to generate a corrected received signal. The corrected received signal can be further processed and interpreted by the receiver.

A method of reducing interference for wireless communication in a wireless device is described. In one configuration, the method may involve generating a combined signal by combining a plurality of received signals from a plurality of respective receive antennas of the wireless device. A common distortion of the plurality of received signals may be estimated based on the combined signal, and interference reduction may be performed on the plurality of received signals based at least in part on the estimated common distortion.

An apparatus for reducing interference for wireless communication in a wireless device is described. In on configuration, the apparatus may include means for generating a combined signal by combining a plurality of received signals from a plurality of respective receive antennas of the wireless device. The apparatus may also include means for estimating a common distortion of the plurality of received signals based on the combined signal, and means for performing interference reduction on the plurality of received signals based at least in part on the estimated common distortion.

Another configuration of an apparatus for reducing interference for wireless communication in a wireless network may include a processor and a memory in electronic communication with the processor. The memory may embody instructions, which may be executable by the processor to: generate a combined signal by combining a plurality of received signals from a plurality of respective receive antennas of the wireless device; estimate a common distortion of the plurality of received signals based on the combined signal; and perform interference reduction on the plurality of received signals based at least in part on the estimated common distortion.

A computer program is also described. The computer program product may be a non-transitory computer-readable medium storing instructions, which may be executable by a processor to: generate a combined signal by combining a plurality of received signals from a plurality of respective receive antennas of the wireless device; estimate a common distortion of the plurality of received signals based on the combined signal; and perform interference reduction on the plurality of received signals based at least in part on the estimated common distortion.

In some examples, respective antenna-specific distortions may be estimated at the receive antennas based at least in part on the common distortion, and the estimation of the respective antenna-specific distortions may include multiplying the common distortion by a vector associated with a respective receive antenna. The vector associated with a respective receive antenna may be estimated using the respective receive antenna and the common distortion. Also, the interference reduction may include removing respective antenna-specific distortion from a received signal to generate a respective corrected signal for a respective receive antenna.

In some examples, generating the combined signal may include applying a plurality of respective combining weights to the plurality of received signals. A magnitude associated with the respective combining weights may be based on a distortion magnitude associated with a respective receive antenna. A phase of each respective combining weight may be matched with a phase of a respective distortion associated with each respective receive antenna, so that distortions of the plurality of received signals coherently combine together. In some cases, a complex scalar estimate may be used as the distortion magnitude and the phase of the respective distortion for each respective receive antenna, and/or the distortion magnitude and the phase of the respective distortion for a respective receive antenna may be estimated based on a correlation between the respective received signal and a selected kernel for use in non-linear interference cancellation. In some cases, the magnitude of a respective combining weight may be proportional to a respective distortion magnitude associated with each respective receive antenna and inversely proportional to a signal-plus-noise power of the respective received signal. In some cases, the magnitude and a phase of a respective combining weight may further be based on one or more spatial characteristics associated with the plurality of respective received signals. The one or more spatial characteristics may include a covariance of signal plus noise power among the plurality of respective received signals, and the plurality of received signals may be whitened by the covariance of the signal plus noise power prior to applying the plurality of respective combining weights.

Some examples may also include generating one or more interference kernels representing one or more respective types of interference expected in the plurality of respective received signals based at least in part on a transmitted signal of an aggressor radio. The estimation of the common distortion may include generating respective coefficients for the one or more interference kernels based on the one or more interference kernels and the combined signal, and multiplying the one or more interference kernels with the respective coefficients and summing over the kernels to obtain the estimated common distortion. Also, in some examples, generating the combined signal may include enhancing an interference to signal plus noise ratio (ISNR) of the combined signal.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods and/or apparatuses for reducing interference for multiple receive antennas. The received signals from each of the multiple receive antennas may be combined into a combined signal, with combining weights given to each of the multiple received signals based on how much distortion and/or noise is present in each of the multiple received signals. The combined signal may be provided to an adaptive filter in order to extract a distortion component that is common to all of the received signals. That common distortion may then be adapted to each of the received signals by multiplying the common distortion by a vector representing the magnitude and phase of the common distortion in each specific received signal. The antenna-specific distortion can then be subtracted from the received signal corresponding to that antenna to generate a corrected received signal, and the corrected received signal can then be further processed and for use in the wireless communication system.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various operations may be added, omitted, or combined. Also, features described with respect to certain embodiments may be combined in other embodiments.

Figure 1:
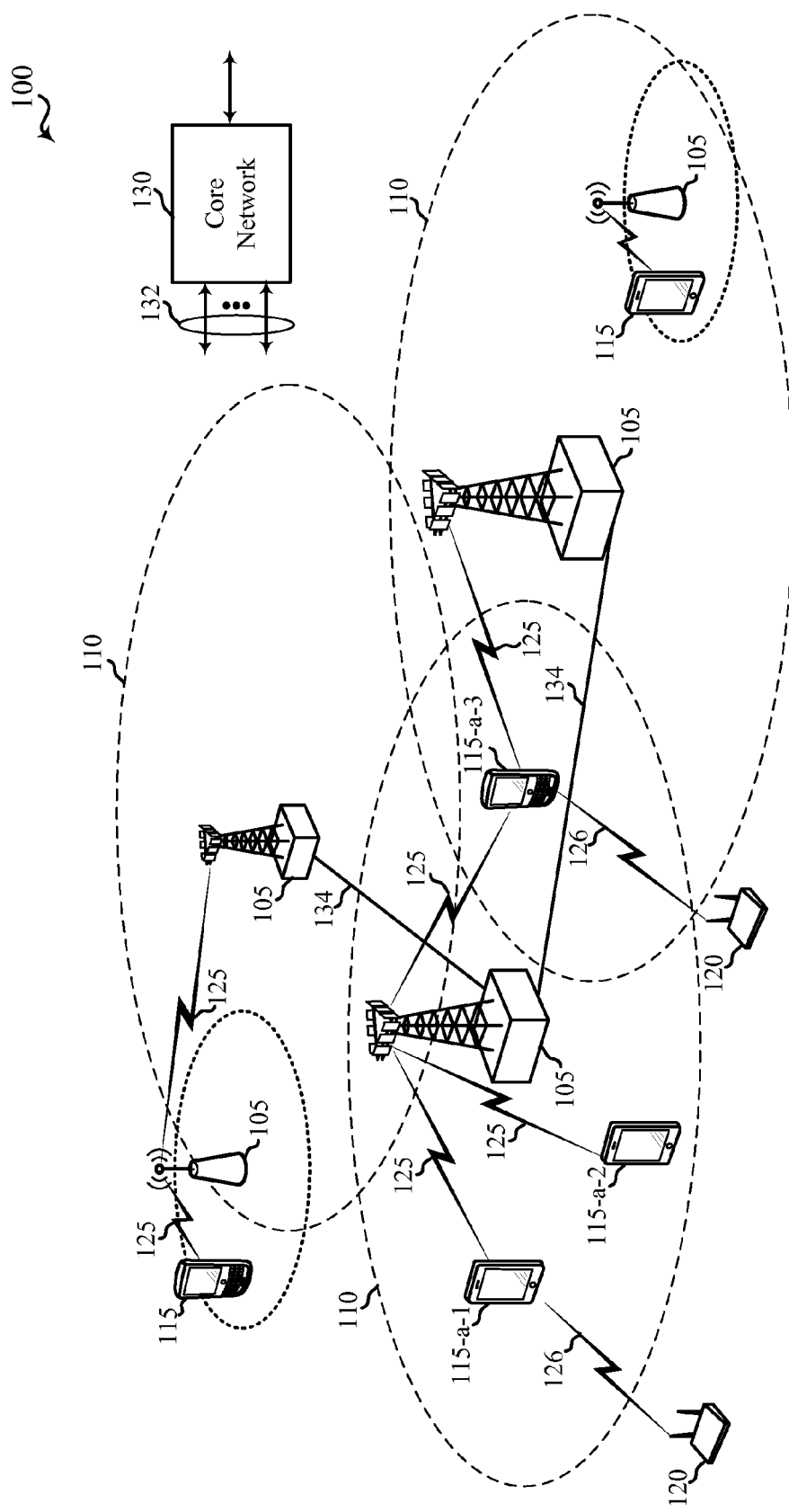
FIG. 1 shows a diagram of a wireless communications system in accordance with aspects of the present disclosure.

FIG. 1 illustrates an example of a wireless communications system 100 in accordance with various embodiments. The system 100 includes base stations 105, communication devices, also known as user equipment UE 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and UE may be generally used to describe the base stations 105 and devices 115, respectively. The system 100 may be a Heterogeneous Long Term Evolution (LTE)/LTE-A network in which different types of base stations provide coverage for various geographical regions. For example, each eNB 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station that may operate in the same or different (e.g., licensed, unlicensed, etc.) frequency bands as macro cells. Small cells include pico cells, femto cells, and micro cells. A pico cell would generally cover a relatively smaller geographic area and may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like).

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may be wireless wide area network (WWAN) connections, including uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

In addition to communicating with base stations 105 using the WWAN communication links 125, the UEs 115 may also employ different radio access technologies (RATs). For example, as illustrated in FIG. 1, UEs 115-*a*-1 and 115-*a*-3 are also configured to communicate with Wi-Fi access points 120 using a wireless local area network (WLAN) communication link 126. Alternatively, or in addition to using WLAN and/or WWAN RATs, one or more of the UEs 115 may use other RATs (such as Bluetooth or Global Positioning System signaling), and/or may utilize multiple types of WLAN or WWAN RATs (such as LTE with carrier aggregation, WCDMA, GSM, etc.). Generally, the UEs 115 may use two or more different types of RATs, and may include two or more antennas for use with the same or different types of RATs, as described in more detail below.

In some embodiments, the use of a first type of RAT may interfere with the use of a second type of RAT and/or with a separate connection using the first type of RAT. As one example, if the center frequency of a WLAN receive communication link 126 is around three times the center frequency of a WWAN transmit communication link 125, a WWAN transmit signal may cause distortion on the WLAN receive signal due to third order harmonics arising from non-linear components (e.g., a power amplifier, duplexer, etc.) in the WWAN transmitter. In this example, the WWAN transmit signal is the "aggressor" and the WLAN receive signal is the "victim." The distortion on the victim WLAN receive signal may be characterized by the distortion of the actual received signal as compared to what the received signal would have been without distortion caused by interference from the aggressor.

As another example of a type of interference, an aggressor WWAN transmit signal may victimize a WWAN receive signal if the center frequency of the WWAN receive signal is around three times the center frequency of the WWAN transmit signal in an LTE system with carrier aggregation. As another example, if a WWAN transmit link 125 is adjacent a WLAN receive link 126, adjacent channel leakage from the WWAN transmit link 125 may victimize the WLAN receive link 126. As yet another example, for UEs 115 with multiple WWANs, an intermodulation product of two or more WWAN communication links 125 may victimize a WWAN receive link 125 on one of the WWANs. As still another example, if the device employs full duplex transmission, imperfect transmit/receive isolation may cause victimization of the receive communications by the transmit communications. Generally speaking, any radio transmission may cause various types of interference with a separate but closely located (e.g., coexisting) radio reception.

In some instances, a single device, such as a UE 115 or base station 105, may be the source of the aggressor/transmitted signal and also the receiver of the victim/received signal. Still referring to FIG. 1, for example, transmissions by the UE 115-*a*-1 over the WWAN communication link 125 may victimize signals received by the UE 115-*a*-1 over the WLAN communication link 126. In these instances, an antenna used to transmit the aggressor signal may be the same or different from the antenna used to receive the victim signal. In other instances, a transmission by a second UE 115-a-2 over a WWAN communication link 125 may victimize (e.g., interfere with) the WLAN communication link 126 for the first UE 115-a-1, causing distortion to the received signal that may affect decoding or other processing for correctly recovering the signal data.

A UE, such as UE 115-a-1, which receives a victimized signal may exploit the correlation between distortion observed on multiple receive antennas to reduce the distortion of the received signals. More specifically, in some aspects, signals from multiple receive antennas (e.g., from two, three, four, or more antennas) may be used to reduce the distortion in respective received signals from each of the respective receive antennas by combining the received signals to generate a combined signal, estimating a common distortion of the multiple received signals based on the combined signal, and performing interference reduction (e.g., removing a part or all of the distortion) on the multiple received signals based at least in part on the estimated common distortion. In devices with multiple receive antennas, the observed distortion among signals received from the multiple antennas may be correlated if the distortion is caused by a common interference source. While the distortion among the plurality of received signals may be correlated, the specific distortion in each received signal may differ in magnitude and phase from the distortion in each of the other received signals due to the different location and therefore different propagation distances from the transmitter to the different receive antennas. Nonetheless, the correlation of the distortion in the multiple received signals may be exploited by combining the received signals together in order to estimate a common distortion and to perform interference reduction based at least in part on the estimated common distortion.

In some instances, the multiple antennas may receive the same signal from a common transmitter, whereas in other instances, the multiple antennas may receive different signals from different transmitters or antennas (e.g., in a multiple-input-multiple-output or MIMO system). For example, and referring still to FIG. 1, the UE 115-a-1 may include two antennas for receiving a single WWAN signal over communication link 125. Another UE 115-a-3, however, may include two antennas for receiving two different WWAN signals from different base stations 105 over different WWAN communication links 125. In each instance, the similarities in the distortion observed by the two different antennas may be used to estimate the common distortion, which can then be used to reduce the distortion in each of the received signals from the separate receive antennas.

Figure 2:
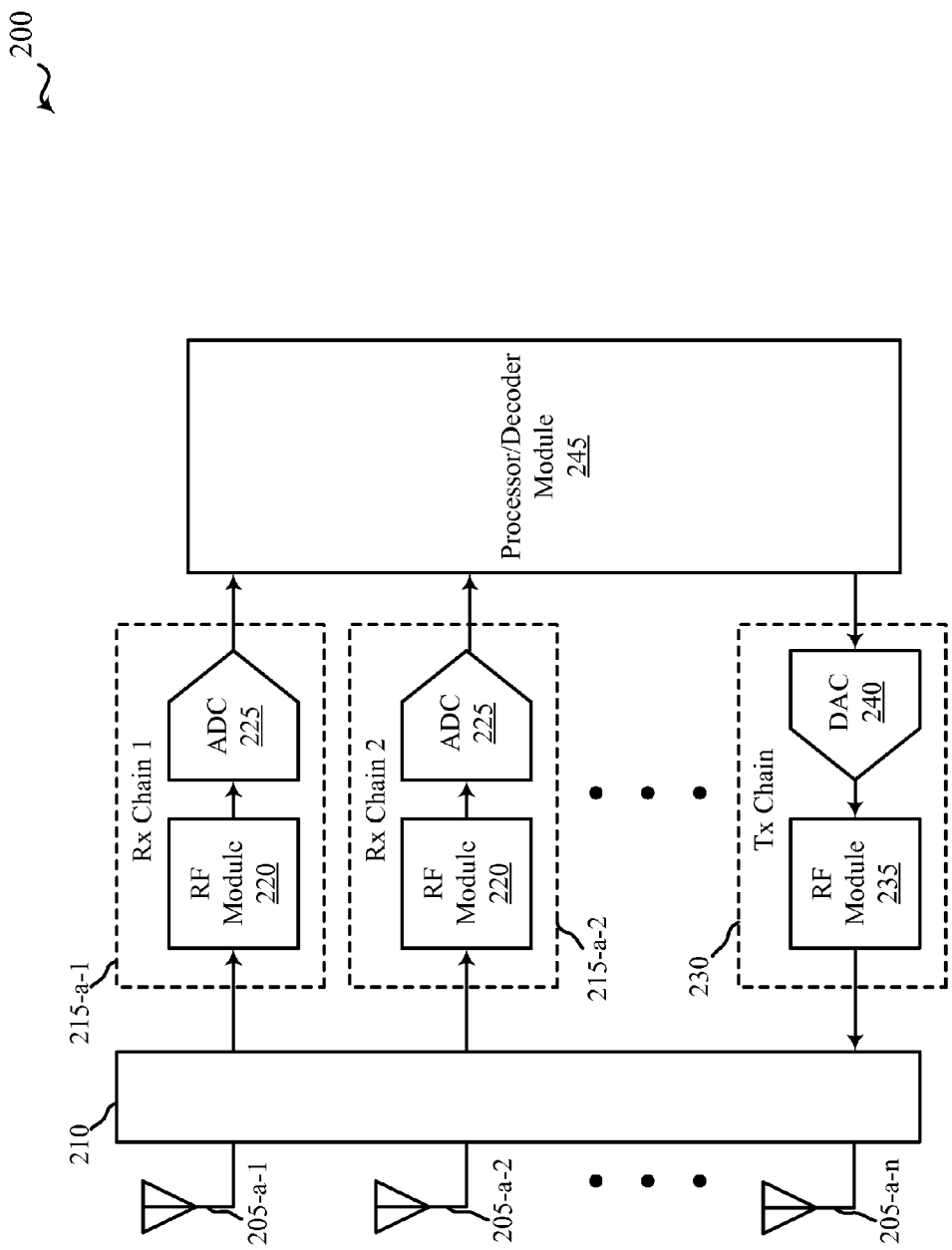
FIG. 2 shows a diagram of a transceiver with multiple receive antennas in accordance with aspects of the present disclosure.

FIG. 2 is a diagram of a multiple antenna transceiver 200. The transceiver 200 may be implemented in a UE 115 or a base station 105 from FIG. 1. The transceiver 200 may include N (e.g., 2, 3, 4, etc.) antennas 205-a-1, 205-a-2, . . . 205-a-n. The transceiver 200 may also include R (e.g., 2, 3, 4, etc.) receiver (Rx) chains, and T (e.g., 1, 2, 4, etc.) transmitter (Tx) chains 230. In the illustrated example, transceiver 200 includes two Rx chains 215-a-1 and 215-a-2 and one Tx chain 230. Each Rx chain 215 may include a radio frequency (RF) module 220 and an analog-to-digital converter (ADC) 225, while each Tx chain 230 may include an RF module 235 and a digital-to-analog converter (DAC) 240. In some embodiments, transceiver 200 may include switch matrix 210 for connecting antennas 205 to the Rx chains 215 and Tx chain(s) 230. The switch matrix 210 may connect each of the Rx chains 215 and/or the Tx chain(s) 230 to any one or more of the antennas 205. In some examples, a single antenna 205 may be connected to both an Rx chain 215 and a Tx chain 230.

In some embodiments, the transceiver 200 may not include a switch matrix, and the antennas 205 may instead be directly coupled with one or more of the Rx chains 215 and/or Tx chains 230. As used herein, "antenna" may refer to an antenna 205 or an antenna 205 and an associated Rx chain 215 or Tx chain 230, depending on context.

During operation, signals received by an antenna 205 are provided to an input of the switch matrix 210, which provides those signals to an input of an Rx chain 215. At the Rx chain 215, the signals are processed (e.g., amplified, downconverted, filtered, etc.) by the RF module 220 and digitized by the ADC 225. The output of the Rx chain 215 is provided to the processor/decoder module 245 for further processing. Similarly, signals to be transmitted by an antenna 205 are provided to the Tx chain 230 by processor decoder module 245, where the signals are converted into analog form by the DAC 240, and then processed (amplified, upconverted, filtered, etc.) by the RF module 235. The output of the RF module 235 is provided (e.g., via the switch matrix 210) to an antenna 205, which transmits the RF signal.

The transceiver 200 may combine signals received from multiple antennas in order to estimate a common distortion among the received signals and perform interference reduction on the received signals based at least in part on the estimated common distortion. The transceiver 200 may also use samples of the transmitted signal from the Tx chain(s) 230 in estimating the common distortion, as described in more detail below.

Figure 3:
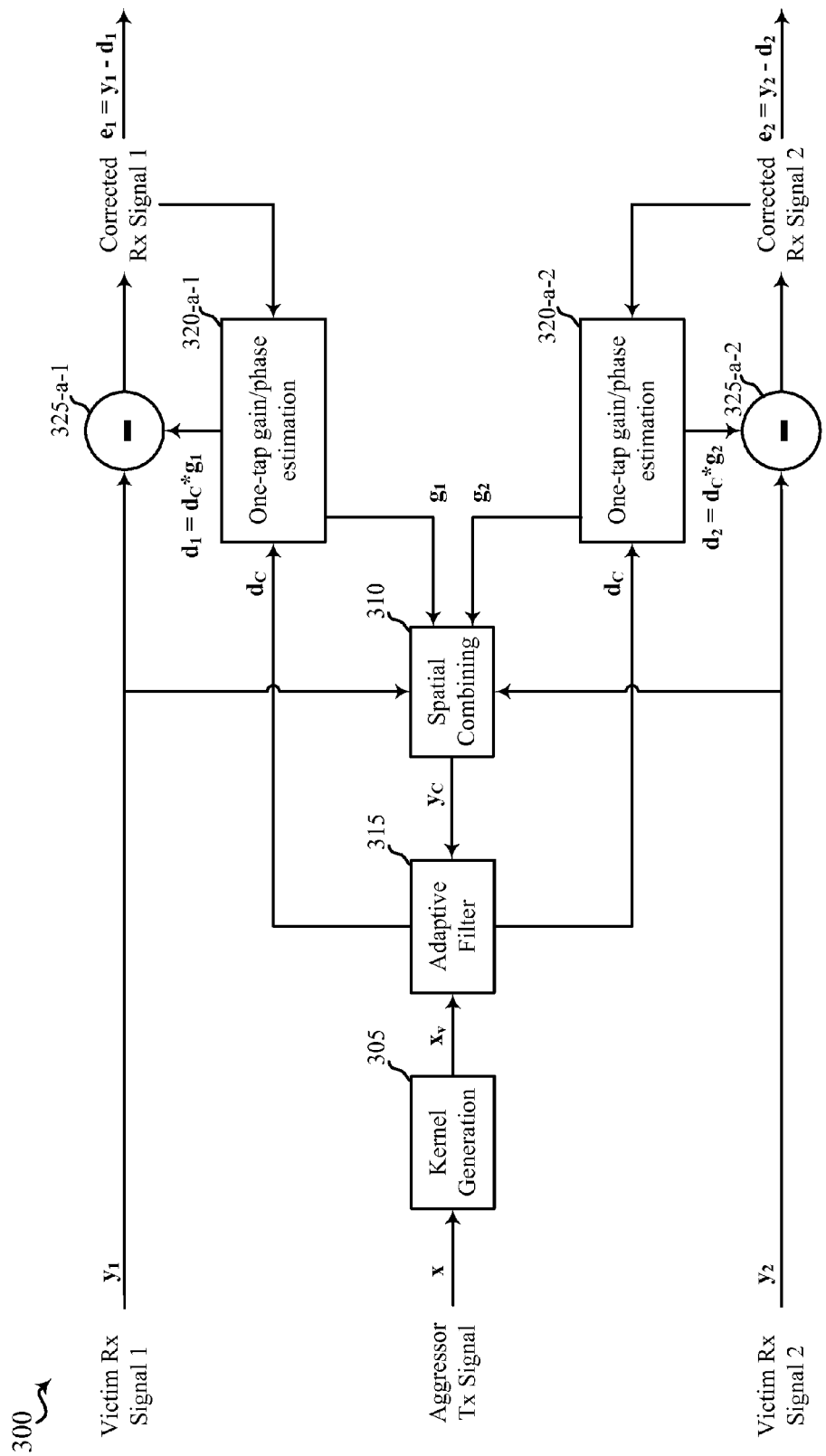
FIG. 3 shows a diagram of an example of reducing interference in a system with multiple receive antennas in accordance with aspects of the present disclosure.

FIG. 3 illustrates a diagram 300 implementing one example of reducing interference in a system with multiple receive antennas that may be used by the transceiver 200 shown in FIG. 2, or more generally by a UE 115, a base station 105, or any wireless communication device with multiple receive antennas. As illustrated in FIG. 3, a first victim received signal $y_1$, a second victim received signal $y_2$, and an aggressor transmitted signal x are used to determine a first corrected received signal $e_1$ and a second corrected received signal $e_2$. The first corrected received signal $e_1$ corresponds to the first victim received signal $y_1$ after interference reduction has been performed on the first victim received signal $y_1$ to remove the distortion caused by the aggressor transmitted signal x. Similarly, the second corrected received signal $e_2$ corresponds to the second victim received signal $y_2$ after interference reduction has been performed on the second victim received signal $y_2$ to remove the distortion caused by the aggressor transmitted signal x.

The interference reduction techniques described herein may use a kernel generation block 305, an adaptive filter block 310, a spatial combining block 315, one-tap gain/phase estimation blocks 320-a-1, 320-a-2, and subtraction blocks 325-a-1, 325-a-2, as illustrated in FIG. 3, to reconstruct and then reduce (e.g., cancel) the estimated distortion in the victim received signals caused by the interference of the aggressor transmitted signal. The estimation and reconstruction of the distortion may be based on the transmitted aggressor signal baseband waveform and on the victim received signal baseband waveforms, in some embodiments.

As illustrated in FIG. 3, samples from the aggressor transmitted signal x are provided to a kernel generation block 305, which generates one or more kernels $x_v$ corresponding to the linear and/or non-linear operations representing the interference mechanism. The type of kernels $x_v$ that are generated generally depends on the types of distortion caused by the aggressor transmitted signal, such as third order harmonics, intermodulation distortion, adjacent channel leakage, and so forth, and may be derived from the samples of the aggressor transmitted signal x. Alternatively, the kernels $x_v$ may be determined elsewhere and provided as-is to the adaptive filter 315—for example, if the aggressor transmitted signal is from a different device, that device, or a common network, may compute the kernels and provide the kernels to the device employing the interference reduction techniques illustrated in FIG. 3.

Still referring to FIG. 3, the first and second victim received signals $y_1$, $y_2$ are provided to a combining block 310, which may combine (e.g., spatially, etc.) the first and second victim received signals $y_1$, $y_2$ to generate a combined victim received signal $y_C$. The kernels $x_v$ together with the combined victim received signal $y_C$ may be provided to the adaptive filter 315, which may be, for example, a non-linear interference cancellation (NLIC) filter. The adaptive filter 315 estimates a common distortion & of (e.g., among) the plurality of received signals based on the combined victim received signal $y_C$ and the received kernels $x_v$. The adaptive filter 315 may, for example, compute coefficients using certain optimization criteria (e.g., to minimize a cost function), which, when combined with the kernels $x_v$, approximate the common distortion & caused by the interference of the aggressor transmitted signal. The one-tap gain/phase estimation blocks 320-a-1, 320-a-2 and the subtraction blocks 325-a-1, 325-a-2 may then perform interference reduction on the plurality of received signals $y_1$, $y_2$ based at least in part on the estimated common distortion $d_C$.

More specifically, in some embodiments, the estimated common distortion $d_C$ may be provided to one-tap gain/phase estimation blocks 320-a-1, 320-a-2 corresponding to each respective receive antenna branch. Each one-tap gain/phase estimation block 320-a-1, 320-a-2 may receive a respective corrected received signal $e_1$, $e_2$ fed back from the output of the subtraction blocks 325-a-1, 325-a-2 (described below). The one-tap gain/phase estimation blocks 320-a-1, 320-a-2 may use the estimated common distortion and the fed back corrected signals $e_1$, $e_2$ in order to determine the magnitude and phase $g_1$, $g_2$ of the distortion component in each respective victim received signal $y_1$, $y_2$, relative to the estimated common distortion $d_C$. The magnitude and phase for each respective victim received signal $y_1$, $y_2$ may include complex components represented as a vector, and may be multiplied by the estimated common distortion to obtain an estimate of the distortion present on each respective received signal corresponding to each respective receive antenna. These antenna-specific distortions $d_1$, $d_2$ may be provided to the subtraction blocks 325-a-1, 325-a-2, which subtract the respective antenna-specific distortion components from the victim received signals $y_1$, $y_2$, respectively, in order to obtain the respective corrected received signals $e_1$, $e_2$.

Taking the upper antenna branch in particular (with the operation of the lower antenna branch being similar), the one-tap gain/phase estimation block 320-a-1 estimates the phase and magnitude $g_1$ of the distortion component of the first victim received signal $y_1$ based on the estimated common distortion dc. The estimation may also be (iteratively) based on the corrected received signal $e_1$, as illustrated in FIG. 3. The estimated phase and magnitude $g_1$ is multiplied by the common distortion $d_C$ to obtain the antenna-specific distortion $d_1$ ($d_1 = d_C * g_1$), which is subtracted from the victim received signal $y_1$ by the subtraction block 325-a-1 to obtain the corrected received signal $e_1$ ($e_1 = y_1 - d_1$). In some embodiments, and as shown in FIG. 3, the estimated phase and magnitude $g_1$ is also provided to the spatial combining block 310 for use in generating combining weights to be used in combining the victim received signals $y_1$, $y_2$.

Note that while FIG. 3 has described a single adaptive filter 315 used to reduce interference on two victim received signals $y_1$, $y_2$ from two respective receive antennas, in other embodiments more than two victim received signals from more than two receive antennas and/or more adaptive filters may be used in similar fashion. For example, a single adaptive filter may be used to reduce interference in three or four victim received signals from three or four respective receive antennas, two adaptive filters could be used to reduce interference in two separate sets of two victim received signals from four respective receive antennas, and so forth. In general, each single adaptive filter may be used with multiple victim received signals in order to improve the performance of the adaptive filter in reducing interference by exploiting the correlation of the distortion components of the victim received signals.

Figure 4:
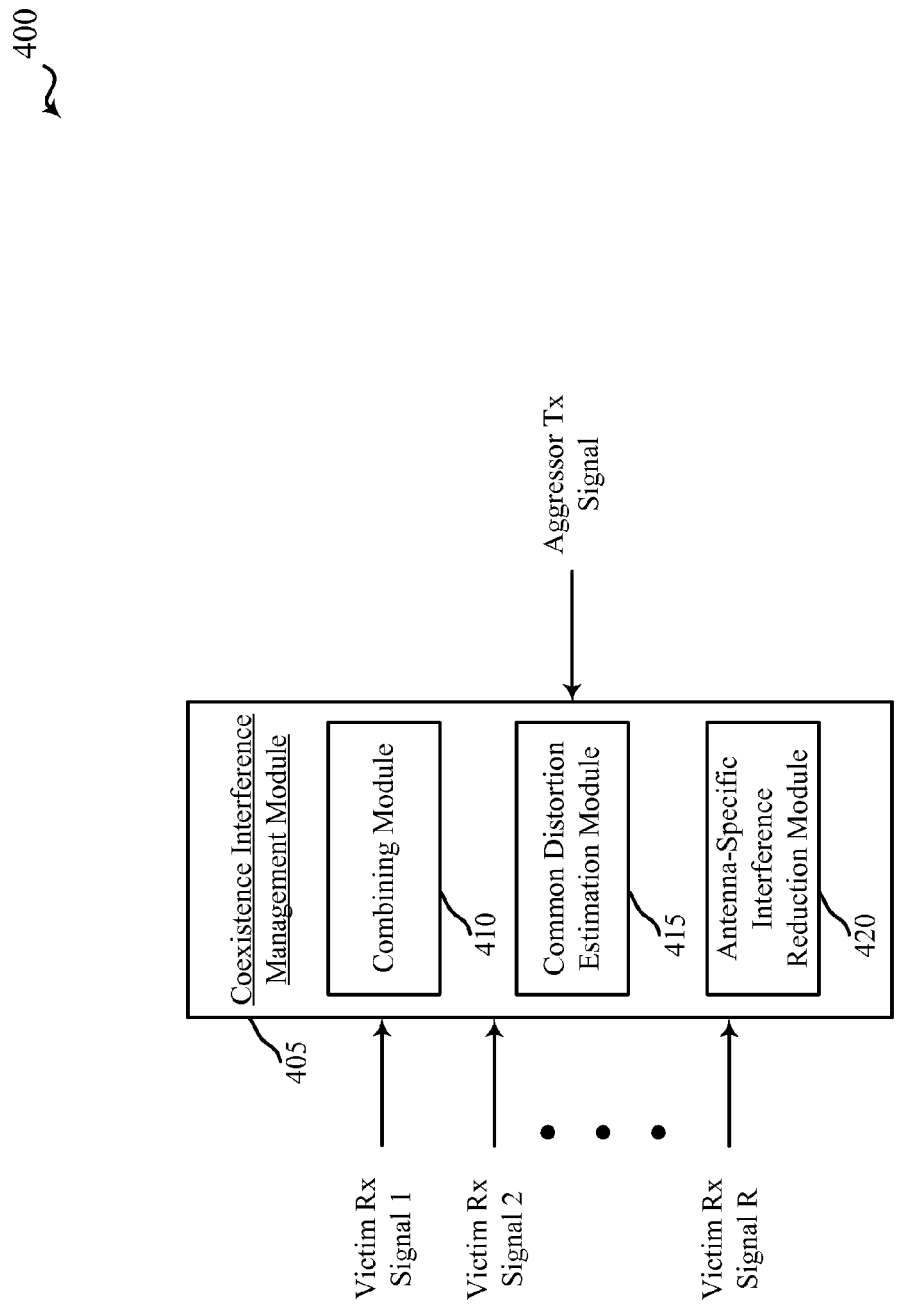
FIG. 4 shows a diagram of a device for reducing interference in accordance with aspects of the present disclosure.

FIG. 4 shows a block diagram of a device 400 that may be used to reduce interference in accordance with various embodiments. The device 400 in FIG. 4 may illustrate aspects of the UEs 115 or base stations 105 in FIG. 1, or the processor/decoder module 245 of the transceiver 200 in FIG. 2. The device 400 may include one or more of the components of diagram 300 illustrated in FIG. 3. The device 400 shown in FIG. 4 includes a coexistence interference management module 405, which in turn includes a combining module 410, a common distortion estimation module 415, and an antenna-specific interference reduction module 420. Each of these components may be in communication with each other.

The components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The coexistence interference management module 405 may be configured to reduce interference for wireless communication in a wireless device, such as a UE 115 or a base station 105 described above with reference to FIG. 1. As illustrated in FIG. 4, the coexistence interference management module 405 may receive R victim received signals (e.g., via Rx chains 215, etc.) together with one or more aggressor transmitted signals, and based on a combined distortion in the received signals and the one or more interference kernel(s) for the aggressor transmitted signal, reduces distortion on the two or more victim received signals caused by interference from the aggressor transmitted signal.

The combining module 410 of the coexistence interference management module 405 in FIG. 4 may be an example of one or more aspects of the spatial combining block 310 in FIG. 3, and may be configured to generate a combined signal by combining a plurality of received signals from a plurality of respective receive antennas of a wireless device. Referring back to FIG. 3, for example, the combining module may combine victim received signals $y_1$, $y_2$ to generate combined signal $y_C$. By combining the plurality of received signals $y_1$, $y_2$ to generate the combined signal $y_C$, the interference-to-signal-plus-noise ratio (ISNR) of the combined signal $y_C$ may be enhanced—for example, the ISNR of the combined signal $y_C$ may be greater than the ISNR of either of the received signals $y_1$, $y_2$. In this manner, the resulting combined signal $y_C$ may be used, even in relatively low ISNR situations, to estimate and then remove the distortion caused by the interference.

In some embodiments, the combining module 410 may apply a plurality of respective combining weights to the plurality of received signals $y_1$, $y_2$ in generating the combined signal $y_C$. In this manner, different received signals can have more or less influence on the combined signal based on, for example, the amount of distortion and/or noise in each of the respective received signals $y_1$, $y_2$. The plurality of victim received signals may be combined in order to exploit the correlation between the distortion components of each of the received signals—more specifically, if the distortion components of the different received signals can be coherently combined, the combined signal will have a greater distortion component than any of the individual received signals. This greater distortion component may lead to improved interference reduction performance because, for example, a non-linear interference cancellation (NLIC) adaptive filter will have a better, more sensitive estimate of the distortion, which may lead to improved performance in removing the distortions.

In some embodiments, each of the plurality of respective combining weights may include a magnitude and a phase, and a vector or complex scalar may be used as the combining weight to represent both the magnitude and phase. The combining module 410 may thus multiply each respective received signal with the respective combining weight, and then sum up each of the products in order to obtain the combined signal. The magnitude and phases of the plurality of respective combining weights may be determined in one of several different manners, some examples of which are described below with reference to FIG. 5.

The common distortion estimation module 415 of the coexistence interference management module 405 in FIG. 4 may be an example of one or more aspects of the adaptive filter 315 in FIG. 3, and may be configured to estimate a common distortion of the plurality of received signals based on the combined signal generated by the combining module 410. The common distortion estimation module may be configured to extract the common distortion from the combined signal using a single NLIC filter, in some embodiments.

In one example, the common distortion estimation module 415 may generate one or more interference kernels representing one or more respective types of distortion expected in the plurality of received signals based at least in part on a transmitted signal of an aggressor radio (e.g., based on the aggressor signal x in FIG. 3). The common distortion estimation module 415 may generate respective coefficients for the one or more interference kernels based on the one or more interference kernels and the combined signal, multiply the one or more interference kernels with the respective coefficients and sum over the kernels to obtain the estimated common distortion, as explained above with reference to the adaptive filter 315 in FIG. 3.

The antenna-specific interference reduction module 420 of the coexistence interference management module 405 in FIG. 4 may be an example of one or more aspects of the one-tap gain/phase estimation block 320-$a$-1 and/or the subtraction block 325-$a$-1 corresponding to the first victim received signal $y_1$ and first receive antenna in FIG. 3, and an example of one or more aspects of the one-tap gain/phase estimation block 320-$a$-2 and/or the subtraction block 325-$a$-2 corresponding to the second victim received signal $y_2$ and second receive antenna in FIG. 3. In some embodiments, a separate antenna-specific interference reduction module 420 may be included for each respective receive antenna branch, although only one is shown in FIG. 4.

The antenna-specific interference reduction module 420 may be configured to perform interference reduction on the plurality of received signals based at least in part on the estimated common distortion. For example, the antenna-specific interference reduction module 420 may estimate respective antenna-specific distortions at each respective receive antenna based on the common distortion, and then remove respective antenna-specific distortions from respective received signals to generate respective corrected signals for respective receive antennas. The corrected signals may then be further processed and used by the device 400—for example, the corrected signal can be interpreted to determine its content (e.g., decoded, etc.).

In some embodiments, the antenna-specific interference reduction module 420 may estimate the antenna-specific distortion at each of the plurality of receive antennas by multiplying the common distortion by a vector associated with the receive antenna. The vector may be estimated using the respective receive antenna and the common distortion—for example, the vector may be estimated using a one-tap gain/phase estimation block, such as blocks 320-$a$-1 and 320-$a$-2 in FIG. 3. In some examples, this same vector may be used to derive the combining weight used by combining module 410 to combine the plurality of victim received signals.

Figure 5:
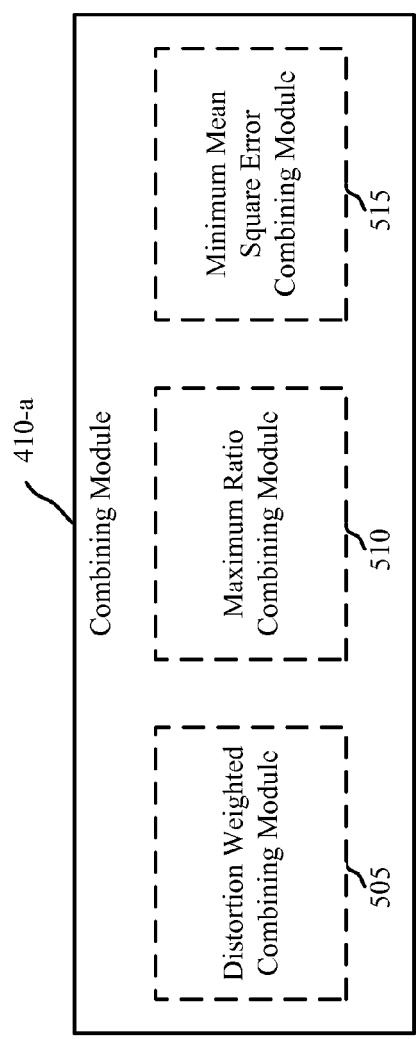
FIG. 5 shows an example of a combining module for use in the device of FIG. 4 in accordance with aspects of the present disclosure.

FIG. 5 shows a block diagram 500 of a combining module 410-$a$ that may be used as the combining module 400 in FIG. 4. The combining module 410-$a$ in FIG. 5 includes distortion weighted combining module 505, maximum ratio combining module 510, and/or minimum mean square error combining module 515 that may be used to combine a plurality of victim received signals. The combining modules 505, 510, 515 in FIG. 5 may each implement a different process for generating the combining weights to be used in combining the plurality of victim received signals by combining module 410 in FIG. 4 or combining module 410-$a$ in FIG. 5.

The components of the combining module 410-$a$ may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The distortion weighted combining (DWC) module 505 may generate a combined signal where the magnitude of each respective combining weight is based on a distortion magnitude associated with each respective receive antenna (or its corresponding received signal). For example, the magnitude of the respective combining weight may be proportional to a magnitude of the distortion component of the respective victim received signal, in some embodiments. The magnitude of the distortion component of the respective victim received signal may be estimated in one of several manners. For example, each respective magnitude may be estimated based on a correlation between the respective received signal and a kernel selected for use in a non-linear interference reduction method (e.g., the kernels generated by block 305 in FIG. 3). As another example, each respective magnitude may be based on an antenna-specific gain estimation used in the antenna-specific reduction module 420 (e.g., the one-tap gain/phase estimation blocks 320-a-1, 320-a-2 in FIG. 3).

The phases of each respective combining weight may be matched with a phase of a respective distortion associated with each respective receive antenna (or its corresponding received signal) such that the distortions of the plurality of received signals coherently combine together. For example, the phase of each respective combining weight may be matched with a phase of the distortion component of the respective victim received signal, so that the distortion components for the plurality of received signals are aligned when combined into the combined signal.

In operation, the DWC module 505 may thus obtain respective combining weights (e.g., including magnitude and phase) corresponding to the respective victim received signals, multiply the received signals with their respective combining weights, and sum the products together to generate the combined signal.

The maximum ratio combining (MRC) module 510 may generate a combined signal where the magnitude of each respective combining weight is based on the distortion magnitude associated with each respective receive antenna (or its corresponding received signal), and also based on a signal-plus-noise power of the respective received signal. For example, the magnitude of the respective combining weight may be proportional to the magnitude of the distortion component of the respective victim received signal and inversely proportional to the signal-plus-noise power of the respective victim received signal.

By making the respective combining weights inversely proportional to the signal-plus noise power of the respective victim received signal, the combined signal may have a stronger distortion component while at the same time reducing (e.g., minimizing) the amount of noise in the combined signal, which may increase the interference-to-signal-plus-noise ratio (ISNR) of the combined signal.

The phases of each respective combining weight may be matched with a phase of a respective distortion associated with each respective receive antenna (or its corresponding received signal) such that the distortions of the plurality of received signals coherently combine together. For example, the phase of each respective combining weight may be matched with a phase of the distortion component of the respective victim received signal, so that the distortion components for the plurality of received signals are aligned when combined into the combined signal.

In operation, the MRC module 510 may thus obtain respective combining weights (e.g., including magnitude and phase) corresponding to the respective victim received signals, multiply the received signals with their respective combining weights, and sum the products together to generate the combined signal.

The minimum mean square error (MMSE) combining module 515 may generate a combined signal where the magnitude and/or phase of each respective combining weight may be based on one or more spatial characteristics associated with the plurality of respective received signals. In some embodiments, the one or more spatial characteristics may include a covariance of signal plus noise power among the plurality of received signals. For example, the magnitude of each respective combining weight may be proportional to the magnitude of the distortion component of the respective victim received signal whitened by the covariance of signal plus noise prior to applying the plurality of respective combining weights.

By basing the respective combining weights on one or more spatial characteristics, the additional degrees of freedom (d.o.f.) provided by the multiple receive antennas may be exploited in order to spatially filter the desired signal to produce the combined distortion signal with an enhanced ISNR, which may lead to improved NLIC performance. It will be appreciated that, in many instances, the aggressor transmitted signal may arrive at the victim receive antennas from a different direction than the victim received signals (e.g., the aggressor transmitted signal may come from a different antenna on the same wireless device as the victim receive antennas, whereas the victim received signals may come from a separate wireless device). By separating the victim and aggressor signals in the spatial domain (e.g., by projecting the victim received signal along the direction of the distortion and away from the victim desired signal), the respective distortion components of each of the victim received signals can be better extracted and combined into the combined signal for use by the common distortion estimation module 415.

The phases of each respective combining weight may be matched with a phase of a respective distortion associated with each respective receive antenna (or its corresponding received signal) such that the distortions of the plurality of received signals coherently combine together. For example, the phase of each respective combining weight may be matched with a phase of the distortion component of the respective victim received signal, so that the distortion components for the plurality of received signals are aligned when combined into the combined signal.

In operation, the MMSE module 515 may thus obtain respective combining weights (e.g., including magnitude and phase) corresponding to the respective victim received signals, multiply the received signals with their respective combining weights, and sum the products together to generate the combined signal.

While several techniques for combining the victim received signals have been described with reference to the combining modules 505, 510, 515 shown in FIG. 5, still other combining techniques may be used in other aspects.

Figure 6:
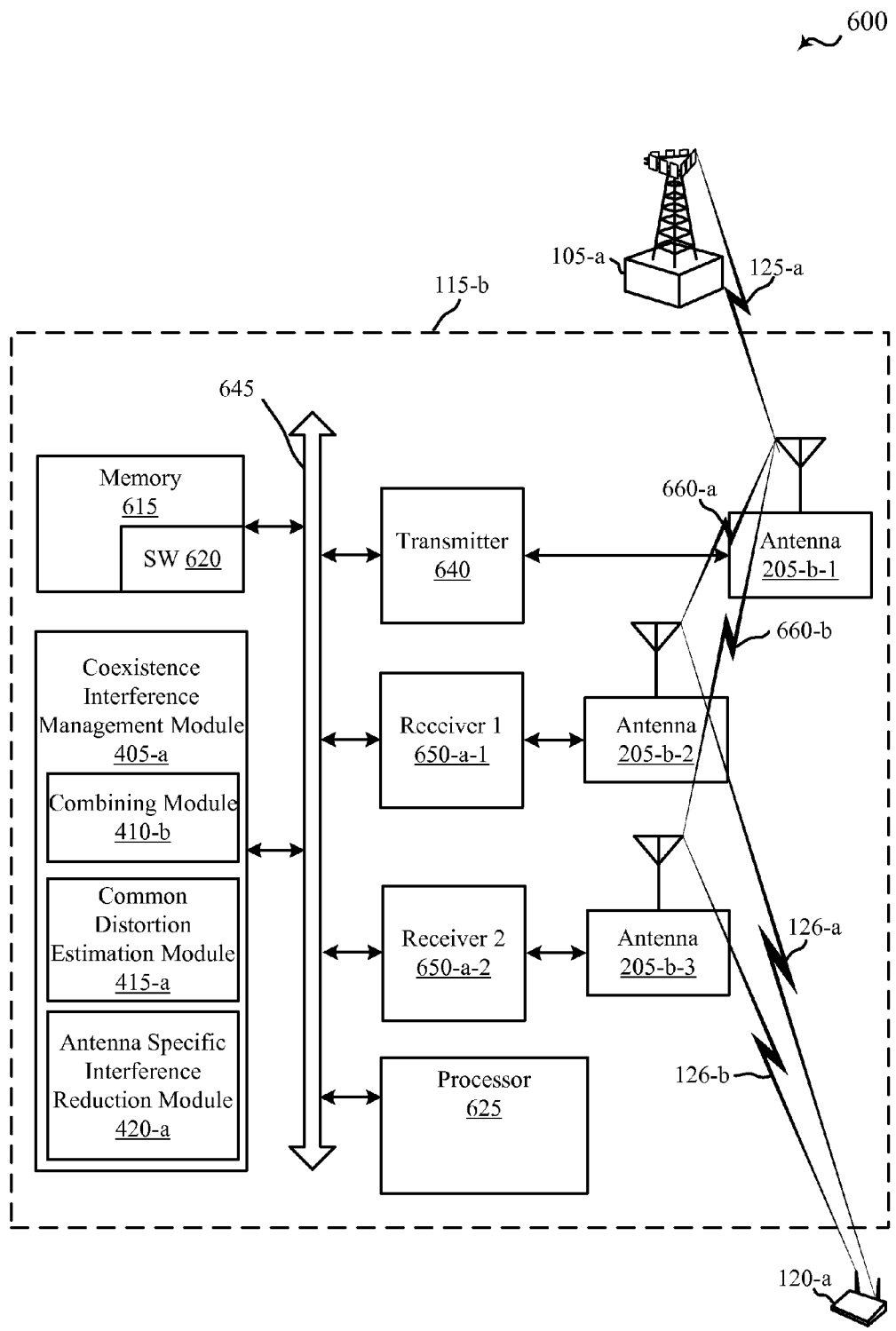
FIG. 6 shows a diagram of a mobile device or UE configured for reducing interference in accordance with aspects of the present disclosure.

FIG. 6 shows a block diagram of a system 600 for use in reducing interference with multiple receive antennas in accordance with various aspects of the present disclosure. System 600 includes UE 115-b, which may be an examples of the UEs 115 in FIG. 1, and which may implement aspects of the transceiver 200 in FIG. 2, the diagram 300 in FIG. 3, and/or the device 400 in FIG. 4. System 600 also includes a base station 105-a, which may be an example of the base stations 105 in FIG. 1, and a WLAN Wi-Fi access point 120-a, which may be an example of the access points 120 in FIG. 1.

The UE 115-b shown in FIG. 6 includes antennas 205-b-1, 205-b-2, 205-b-3, a transmitter module 640, two receiver modules 650-a-1, 650-a-2, a processor module 625, and memory 615 (e.g., including software (SW) 620), which each may communicate, directly or indirectly, with each other (e.g., via one or more buses 645). The transmitter module 640 and the receiver modules 650-a-1, 650-a-2 may be configured to communicate with one or more base stations 105-a and/or WLAN access points 120-a, as described above. The transmitter module 640 may include a modem configured to modulate the packets and provide the modulated packets to the antenna 205-b-1 for transmission, while the receiver modules 650-a-1, 650-a-2 may each include a modem configured to demodulate packets received from respective antennas 205-b-2, 205-b-3. The antennas 205-b-1, 205-b-2, 205-b-3 may each be capable of concurrently transmitting and receiving one or more wireless transmissions. The UE 115-b may thus be capable of concurrently communicating with one or more base stations 105-a and/or one or more WLAN access points 120-a.

The memory 615 may include random access memory (RAM) and/or read-only memory (ROM). The memory 615 may store computer-readable, computer-executable software/firmware code 620 containing instructions that are configured to, when executed, cause the processor module 625 to perform various functions described herein (e.g., make and/or execute offloading determinations). Alternatively, the software/firmware code 620 may not be directly executable by the processor module 625 but be configured to cause a computer (e.g., when compiled and executed) to perform functions described herein. The processor module 625 may include an intelligent hardware device, e.g., a central processing unit (CPU), a microcontroller, an application-specific integrated circuit (ASIC), etc. may include random access memory (RAM) and read-only memory (ROM).

The UE 115-b may also include a coexistence interference management module 405-a, which may be an example of the coexistence interference management module 405 of FIG. 4. The coexistence interference management module 405-a may include a combining module 410-b, which may be an example of one or more aspects of the combining modules 410 of FIG. 4 or 5 or the spatial combining block 310 in FIG. 3. The coexistence interference management module 405-a of the UE 115-b may also include a common distortion estimation module 415-a, which may be an example of one or more aspects of the common distortion estimation module 415 shown in FIG. 4 or the adaptive filter block 315 in FIG. 3. The coexistence interference management module 405-a of the UE 115-b may include one or more antenna-specific interference reduction modules 420-a, which may be examples of one or more aspects of the antenna-specific interference reduction module 420 in FIG. 4 or the one-tap gain/phase estimation blocks 320-a-1, 320-a-2 and/or subtraction blocks 325-a-1, 325-a-2 in FIG. 3.

FIG. 6 illustrates an example in which the transmitter module 640 is transmitting a wireless communication to the base station 105-a via the a WWAN communication link 125-a using antenna 205-b-1, and the receivers 650-a-1, 650-a-2 are receiving a wireless communication from the WLAN access point 120-a via WLAN communication links 126-a and 126-b using respective antennas 205-b-2 and 205-b-3. As illustrated by interference paths 660-a and 660-b in FIG. 6, the WWAN transmitted signal from the antenna 205-b-1 may interfere with the WLAN received signal, thereby causing distortion on the signal received at the antennas 205-b-2 and 205-b-3. It will be appreciated that the communication links 125, 126 and interference 660 illustrated in FIG. 6 are just one example, and that many others types of wireless communication links, types of interference, and interference reduction techniques are within the scope of the present disclosure. For example, while antenna 205-b-1 is shown as being physically separate from antennas 205-b-2 and 205-b-3 in the example given in FIG. 6, in other examples, the transmitter 640 may use one of the antennas 205-b-2 or 205-b-3 used by the receivers 650-a-1 or 650-a-2.

Figure 7:
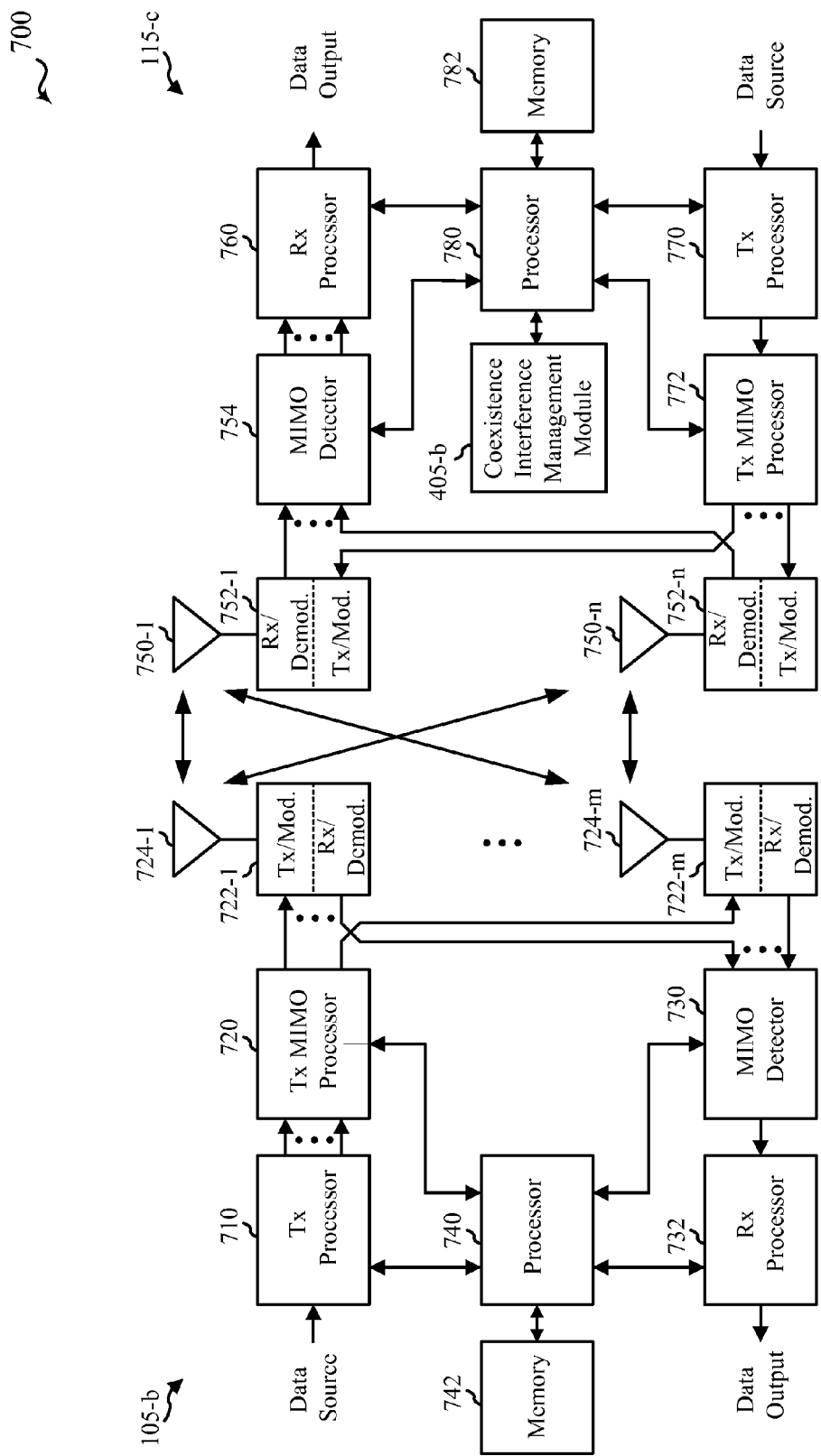
FIG. 7 shows a diagram of a MIMO communication system including a base station or eNB and a mobile device or UE in accordance with aspects of the present disclosure.

FIG. 7 is a block diagram of a MIMO communication system 700 including a base station or eNB 105-b and a mobile device or UE 115-c. The base station 105-b may be an example of one or more aspects of the base stations 105 of FIGS. 1 and 6, while the mobile device 115-c may be an example of one or more aspects of the UEs 115 of FIGS. 1 and 6. This system 700 may illustrate aspects of the systems 100 or 600 of FIG. 1 or 6, aspects of the transceiver 200 of FIG. 2, aspects of the components described with reference to FIG. 3, aspects of the device 400 described with reference to FIGS. 4 and 5, and so forth. The base station 105-b may be equipped with M antennas 724-1 through 724-m, and the mobile device 115-c may be equipped with N antennas 750-1 through 752-n. In the system 700, the base station 105-b may be able to send data over multiple communication links at the same time. Each communication link may be called a "layer" and the "rank" of the communication link may indicate the number of layers used for communication. Each layer may transmit a different data stream. Additionally or alternatively, the base station 105-b may employ transmit diversity to improve robustness of transmissions received by the mobile device 115-c. The mobile device 115-c may employ receive diversity using multiple receive antennas to combine signals received at multiple antennas.

At the base station 105-b, a transmit (Tx) processor 710 may receive data from a data source. The transmit processor 710 may process the data. The transmit processor 710 may also generate reference symbols, and a cell-specific reference signal. A transmit (Tx) MIMO processor 720 may perform spatial processing (e.g., precoding) on data symbols, control symbols, and/or reference symbols, if applicable, and may provide output symbol streams to the transmit modulators 722-1 through 722-m. Each modulator 722 may process a respective output symbol stream (e.g., for OFDM, etc.) to obtain an output sample stream. Each modulator 722 may further process (e.g., convert to analog, amplify, filter, and upconvert) the output sample stream to obtain a downlink (DL) signal. In one example, DL signals from modulators 722-1 through 722-m may be transmitted via the antennas 724-1 through 724-m, respectively. The processor 740 may control the operation of the transmit processor 710 and the Tx MIMO processor 720, and may perform other functions such as resource scheduling or communication with other network entities (e.g., S-GW, MME, etc.) or other base stations 105. Instructions or data for processor 740 may be stored in memory 742.

At the mobile device 115-c, the mobile device antennas 750-1 through 750-n may receive the DL signals from the base station 105-b and may provide the received signals to the demodulators 752-1 through 752-n, respectively. Each demodulator 752 may condition (e.g., filter, amplify, downconvert, and digitize) a respective received signal to obtain input samples. Each demodulator 752 may further process the input samples (e.g., for OFDM, etc.) to obtain received symbols. A MIMO detector 754 may obtain received symbols from all the demodulators 752-1 through 752-n, perform MIMO detection on the received symbols if applicable, and provide detected symbols. A receive (Rx) processor 760 may process (e.g., demodulate, deinterleave, and decode) the detected symbols, providing decoded data for the mobile device 115-c to a data output, and provide decoded control information to a processor 780, or memory 782.

The mobile device 115-c may employ interference reduction techniques as previously described herein. The mobile device 115-c may include a coexistence interference management module 405-b to perform interference reduction, which may be an example of one or more aspects of the coexistence interference management modules 405 shown and described above with reference to FIG. 4 or 6. For example, the coexistence interference management module 405-b may generate a combined signal by combining received signals from receive antennas 750-1 through 750-n (e.g., using DWC, MRC, or MMSE, etc.). The coexistence interference management module 405-b may generate one or more interference kernels representing one or more respective types of distortion expected in the received signals from receive antennas 750-1 through 750-n based at least in part on a transmitted signal of an aggressor radio (e.g., another radio on the mobile device 115-c or on a different device, etc.). The coexistence interference management module 405-b may generate respective coefficients for the one or more interference kernels based on the one or more interference kernels and the combined signal, and may estimate the common distortion by summing over the kernels. The coexistence interference management module 405-b may perform interference reduction on the plurality of received signals based at least in part on the estimated common distortion.

On the uplink (UL), at the mobile device 115-c, a transmit (Tx) processor 770 may receive and process data from a data source or the processor 780 coupled with memory 782. The transmit processor 770 may also generate reference symbols for a reference signal. The symbols from the transmit processor 770 may be precoded by a transmit (Tx) MIMO processor 772 if applicable, further processed by modulators 752-a through 752-n (e.g., for SC-FDMA, etc.), and be transmitted to the base station 105-b in accordance with the transmission parameters received from the base station 105-b. At the base station 105-b, the UL signals from the mobile device 115-c may be received by the antennas 724, processed by the demodulators 722, detected by a MIMO detector 730 if applicable, and further processed by a receive (Rx) processor 732. The receive processor 732 may provide decoded data to a data output and to the processor 740.

Though not illustrated in FIG. 7, in some embodiments, the base station 105-b may also or alternatively include a coexistence interference management module, which may be used to reduce interference on transmitted signals received at two or more antennas 724 of the base station 105-b.

The components of the base station 105-b may, individually or collectively, be implemented with one or more Application Specific Integrated Circuits (ASICs) adapted to perform some or all of the applicable functions in hardware. Each of the noted modules may be a means for performing one or more functions related to operation of the system 700. Similarly, the components of the mobile device 115-c may, individually or collectively, be implemented with one or more Application Specific Integrated Circuits (ASICs) adapted to perform some or all of the applicable functions in hardware. Each of the noted components may be a means for performing one or more functions related to operation of the system 700.

Figure 8:
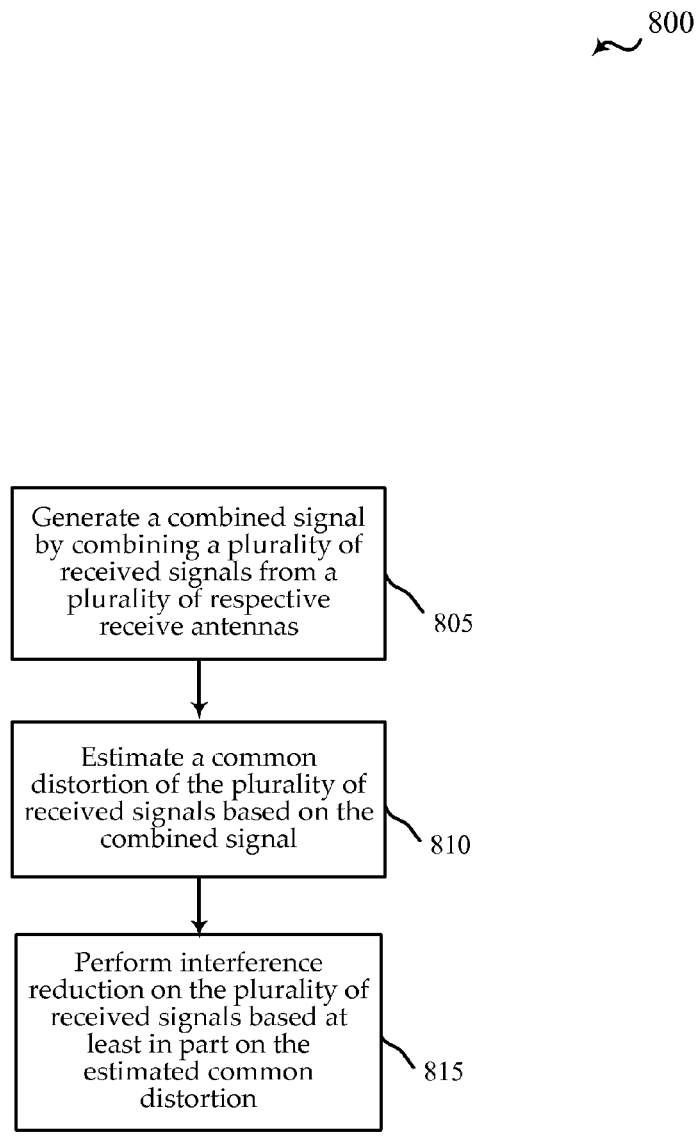
FIG. 8 is a flowchart illustrating a method for reducing interference in a system with multiple receive antennas in accordance with aspects of the present disclosure.

FIG. 8 shows a flowchart 800 illustrating a method of reducing interference for wireless communication in accordance with various aspects. The functions of flowchart 800 may be implemented by any of the UEs 115 and/or base stations 105 described herein, including by using one or more aspects of the multi-antenna transceiver 200 of FIG. 2, the components illustrated in FIG. 3, the device 400 illustrated in FIGS. 4 and 5, the systems 600 or 700 illustrated in FIG. 6 or 7, and so forth.

At block 805, a combined signal is generated by combining a plurality of received signals from a plurality of respective receive antennas. The combined signal may be generated, for example, using DWC, MRC, or MMSE combining of the received signals, as described above. In each of these spatial combining techniques, a plurality of respective combining weights may be generated for each respective receive signal, and the combined signal may be generated by applying each respective combining weight to its respective received signal, and then summing the weighted signals together. For DWC combining, the magnitude associated with each combining weight may be based on a distortion magnitude associated with a respective receive antenna, and the phase associated with each combining weight may be matched with a phase of a respective distortion associated with each respective receive antenna so that distortions of the plurality of received signals coherently combine together. In one example, a complex scalar estimate may be used as the distortion magnitude and the phase of the respective distortion for each respective receive antenna. In another example, the distortion magnitude and the phase of the respective distortion for a respective receive antenna may be estimated based on a correlation between the respective received signal and a selected kernel for use in non-linear interference cancellation.

For MRC combining, the magnitude of each respective combining weight may be proportional to a respective distortion magnitude associated with a respective receive antenna and inversely proportional to a signal-plus-noise power of the respective received signal. In MMSE combining, the magnitude and phase of each respective combining weight may be based at least in part on one or more spatial characteristics associated with the plurality of respective received signals. For example, the covariance of the signal-plus-noise power among the plurality of respective received signals may be used as the spatial characteristic, and the plurality of received signals may be whitened by the covariance of the signal-plus-noise power prior to applying the plurality of respective combining weights. In some embodiments, combining of the plurality of received signals may include enhancing the interference to signal plus noise ratio (ISNR) of the combined signal.

At block 810, a common distortion of (e.g., among) the plurality of received signals is estimated based at least in part on the combined signal. The common distortion may be estimated using, for example, a non-linear interference cancellation adaptive filter using the combined signal from block 805. The adaptive filter may receive one or more interference kernels representing one or more types of interference expected in the plurality of received signals that are based at least in part on a transmitted signal of an aggressor radio. In one example, estimating the common distortion may include generating respective coefficients for the one or more interference kernels based on the one or more interference kernels and the combing signal, and multiplying the one or more interference kernels with the respective coefficients and summing over the kernels to obtain the estimated common distortion.

At block 815, interference reduction is performed on the plurality of received signals based at least in part on the estimated common distortion. The interference reduction may be performed by, for example, estimating respective antenna-specific distortions at each receive antenna based at least in part on the common distortion estimated in block 810, and then removing the respective antenna-specific distortion from each received signal to generate respective corrected signals for each respective receive antenna. In some embodiments, the antenna-specific distortions may be estimated by multiplying the common distortion by a vector associated with a respective receive antenna. The vector associated with each respective receive antenna may be estimated using the respective receive antenna and the common distortion.

It should be noted that the method of flowchart 800 is just one implementation of the operations of the method, and that the operations may be rearranged or otherwise modified such that other implementations are possible.

Figure 9:
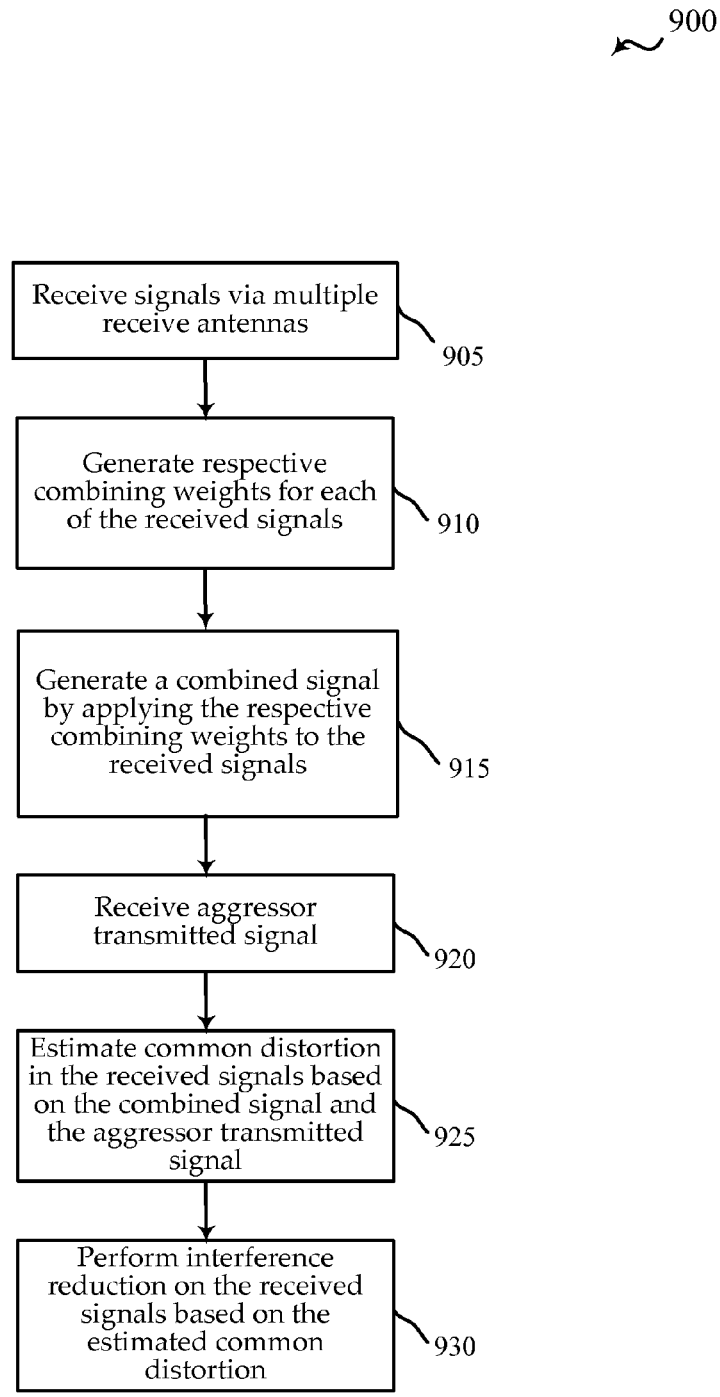
FIG. 9 is a flowchart illustrating a method for reducing interference in a system with multiple receive antennas in accordance with aspects of the present disclosure.

FIG. 9 shows a flowchart 900 illustrating a method of performing interference reduction in accordance with various aspects. The functions of flowchart 900 may be implemented by any of the UEs 115 and/or base stations 105 described herein, including by using one or more aspects of one or more of the multi-antenna transceiver 200 of FIG. 2, the example illustrated in FIG. 3, the device 400 illustrated in FIGS. 4 and 5, the systems 600, 700 illustrated in FIGS. 6 and 7, and so forth.

At block 905, signals are received via multiple receive antennas. At block 910, respective combining weights are generated for each of the received signals. The combining weights may be based on, for example, the amount of distortion and/or noise in each of the respective received signals.

At block 915, a combined signal is generated by applying the respective combining weights to the plurality of victim received signals and summing the weighted signals together. The combining may be performed, for example, according to the DWC, MRC, or MMSE spatial combining techniques described above.

At block 920, an aggressor transmitted signal is received. At block 925, a common distortion of the plurality of received signals is estimated based on the combined signal and the aggressor transmitted signal. At block 930, interference reduction is performed on the received signals based at least in part on the estimated common distortion. In some embodiments, the interference reduction for each received signal may apply one-tap gain/phase estimation to the common distortion and subtracting the antenna-specific distortion from the respective received signal.

It should be noted that the method of flowchart 900 is just one implementation of the operations of the method, and that the operations may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of reducing interference for wireless communication in a wireless device, comprising:
   generating a combined signal by combining a plurality of received signals from a plurality of respective receive antennas of the wireless device;
   estimating a common distortion of the plurality of received signals based on the combined signal;
   estimating respective antenna-specific distortions at the receive antennas based at least in part on the common distortion, the estimating respective antenna-specific distortions comprising multiplying the common distortion by a vector associated with a respective receive antenna; and
   performing interference reduction on the plurality of received signals based at least in part on the estimated common distortion.

2. The method of claim 1, wherein the vector associated with a respective receive antenna is estimated using the respective receive antenna and the common distortion.

3. The method of claim 1, wherein performing interference reduction comprises:
   removing respective antenna-specific distortion from a received signal to generate a respective corrected signal for a respective receive antenna.

4. The method of claim 1, wherein generating the combined signal comprises:
   applying a plurality of respective combining weights to the plurality of received signals.

5. The method of claim 4, wherein a magnitude associated with the respective combining weights is based on a distortion magnitude associated with a respective receive antenna.

6. The method of claim 5, wherein a phase of each respective combining weight is matched with a phase of a respective distortion associated with each respective receive antenna, so that distortions of the plurality of received signals coherently combine together.

7. The method of claim 6, wherein a complex scalar estimate is used as the distortion magnitude and the phase of the respective distortion for each respective receive antenna.

8. The method of claim 6, wherein the distortion magnitude and the phase of the respective distortion for a respective receive antenna is estimated based on a correlation between the respective received signal and a selected kernel for use in non-linear interference cancellation.

9. The method of claim 4, wherein a magnitude of a respective combining weight is proportional to a respective distortion magnitude associated with each respective receive antenna and inversely proportional to a signal-plus-noise power of the respective received signal.

10. The method of claim 4, wherein a magnitude and a phase of a respective combining weight is further based on one or more spatial characteristics associated with the plurality of respective received signals.

11. The method of claim 10, wherein the one or more spatial characteristics include a covariance of signal plus noise power among the plurality of respective received signals.

12. The method of claim 11, wherein the plurality of received signals are whitened by the covariance of the signal plus noise power prior to applying the plurality of respective combining weights.

13. The method of claim 1, further comprising:
    generating one or more interference kernels representing one or more respective types of interference expected in the plurality of respective received signals based at least in part on a transmitted signal of an aggressor radio.

14. The method of claim 13, wherein estimating the common distortion comprises:
    generating respective coefficients for the one or more interference kernels based on the one or more interference kernels and the combined signal; and
    multiplying the one or more interference kernels with the respective coefficients and summing over the one or more interference kernels to obtain the estimated common distortion.

15. The method of claim 1, wherein generating the combined signal includes enhancing an interference to signal plus noise ratio (ISNR) of the combined signal.

16. An apparatus for reducing interference for wireless communication in a wireless device, comprising:
    means for generating a combined signal by combining a plurality of received signals from a plurality of respective receive antennas of the wireless device;
    means for estimating a common distortion of the plurality of received signals based on the combined signal;
    means for estimating respective antenna-specific distortions at the receive antennas based at least in part on the common distortion, wherein the means for estimating respective antenna-specific distortions multiplies the common distortion by a vector associated with a respective receive antenna; and
    means for performing interference reduction on the plurality of received signals based at least in part on the estimated common distortion.

17. The apparatus of claim 16, wherein the means for generating the combined signal applies a plurality of respective combining weights to the plurality of received signals.

18. The apparatus of claim 17, wherein a magnitude associated with the respective combining weights is based on a distortion magnitude associated with a respective receive antenna.

19. The apparatus of claim 17, wherein a magnitude of a respective combining weight is proportional to a respective distortion magnitude associated with each respective receive antenna and inversely proportional to a signal-plus-noise power of the respective received signal.

20. The apparatus of claim 17, wherein a magnitude and a phase of a respective combining weight is further based on one or more spatial characteristics associated with the plurality of respective received signals.

21. An apparatus for reducing interference for wireless communication in a wireless device, comprising:
    a processor; and
    memory in electronic communication with the processor, the memory embodying instructions, the instructions being executable by the processor to:

generate a combined signal by combining a plurality of received signals from a plurality of respective receive antennas of the wireless device;

estimate a common distortion of the plurality of received signals based on the combined signal;

estimate respective antenna-specific distortions at the receive antennas based at least in part on the common distortion by multiplying the common distortion by a vector associated with a respective receive antenna; and perform interference reduction on the plurality of received signals based at least in part on the estimated common distortion.

22. The apparatus of claim 21, wherein the memory further comprises instructions executable by the processor to:

apply a plurality of respective combining weights to the plurality of received signals.

23. The apparatus of claim 22, wherein a magnitude associated with the respective combining weights is based on a distortion magnitude associated with a respective receive antenna.

24. The apparatus of claim 22, wherein a magnitude of a respective combining weight is proportional to a respective distortion magnitude associated with each respective receive antenna and inversely proportional to a signal-plus-noise power of the respective received signal.

25. The apparatus of claim 22, wherein a magnitude and a phase of a respective combining weight is further based on one or more spatial characteristics associated with the plurality of respective received signals.

26. A non-transitory computer-readable medium for reducing interference for wireless communication in a wireless device, the non-transitory computer-readable medium storing computer-executable code for:

generating a combined signal by combining a plurality of received signals from a plurality of respective receive antennas of the wireless device;

estimating a common distortion of the plurality of received signals based on the combined signal;

estimating respective antenna-specific distortions at the receive antennas based at least in part on the common distortion, the estimating respective antenna-specific distortions comprising multiplying the common distortion by a vector associated with a respective receive antenna; and performing interference reduction on the plurality of received signals based at least in part on the estimated common distortion.

27. A method of reducing interference for wireless communication in a wireless device, comprising:

generating a combined signal by combining a plurality of received signals from a plurality of respective receive antennas of the wireless device, the generating comprising applying a plurality of respective combining weights to the plurality of received signals, wherein a magnitude associated with the plurality of respective combining weights is based at least in part on a distortion magnitude associated with a respective receive antenna, and wherein a phase of each respective combining weight is matched with a phase of a respective distortion associated with each respective receive antenna, so that distortions of the plurality of received signals coherently combine together;

estimating a common distortion of the plurality of received signals based at least in part on the combined signal; and performing interference reduction on the plurality of received signals based at least in part on the estimated common distortion.

28. An apparatus for reducing interference for wireless communication in a wireless device, comprising:

a processor; and memory in electronic communication with the processor, the memory embodying instructions, the instructions being executable by the processor to:

generate a combined signal by combining a plurality of received signals from a plurality of respective receive antennas of the wireless device by applying a plurality of respective combining weights to the plurality of received signals, wherein a magnitude associated with the plurality of respective combining weights is based at least in part on a distortion magnitude associated with a respective receive antenna, and wherein a phase of each respective combining weight is matched with a phase of a respective distortion associated with each respective receive antenna, so that distortions of the plurality of received signals coherently combine together;

estimate a common distortion of the plurality of received signals based at least in part on the combined signal; and perform interference reduction on the plurality of received signals based at least in part on the estimated common distortion.

29. A method of reducing interference for wireless communication in a wireless device, comprising:

generating a combined signal by combining a plurality of received signals from a plurality of respective receive antennas of the wireless device, the generating comprising applying a plurality of respective combining weights to the plurality of received signals, wherein a magnitude of a respective combining weight is proportional to a respective distortion magnitude associated with each respective receive antenna and inversely proportional to a signal-plus-noise power of the respective received signal;

estimating a common distortion of the plurality of received signals based at least in part on the combined signal; and performing interference reduction on the plurality of received signals based at least in part on the estimated common distortion.

30. An apparatus for reducing interference for wireless communication in a wireless device, comprising:

a processor; and memory in electronic communication with the processor, the memory embodying instructions, the instructions being executable by the processor to:

generate a combined signal by combining a plurality of received signals from a plurality of respective receive antennas of the wireless device by applying a plurality of respective combining weights to the plurality of received signals, wherein a magnitude of a respective combining weight is proportional to a respective distortion magnitude associated with each respective receive antenna and inversely proportional to a signal-plus-noise power of the respective received signal;

estimate a common distortion of the plurality of received signals based at least in part on the combined signal; and perform interference reduction on the plurality of received signals based at least in part on the estimated common distortion.

31. A method of reducing interference for wireless communication in a wireless device, comprising:
- generating a combined signal by combining a plurality of received signals from a plurality of respective receive antennas of the wireless device;
- generating one or more interference kernels representing one or more respective types of interference expected in the plurality of respective received signals based at least in part on a transmitted signal of an aggressor radio;
- estimating a common distortion of the plurality of received signals based at least in part on the combined signal, the estimating comprising:
  - generating respective coefficients for the one or more interference kernels based on the one or more interference kernels and the combined signal; and
  - multiplying the one or more interference kernels with the respective coefficients and summing over the one or more interference kernels to obtain the estimated common distortion; and
- performing interference reduction on the plurality of received signals based at least in part on the estimated common distortion.

32. An apparatus for reducing interference for wireless communication in a wireless device, comprising:
- a processor; and
- memory in electronic communication with the processor, the memory embodying instructions, the instructions being executable by the processor to:
  - generate a combined signal by combining a plurality of received signals from a plurality of respective receive antennas of the wireless device;
  - generate one or more interference kernels representing one or more respective types of interference expected in the plurality of respective received signals based at least in part on a transmitted signal of an aggressor radio;
  - estimate a common distortion of the plurality of received signals based at least in part on the combined signal by:
    - generating respective coefficients for the one or more interference kernels based on the one or more interference kernels and the combined signal; and
    - multiplying the one or more interference kernels with the respective coefficients and summing over the one or more interference kernels to obtain the estimated common distortion; and
  - perform interference reduction on the plurality of received signals based at least in part on the estimated common distortion.

* * * * *